Patented May 1, 1934

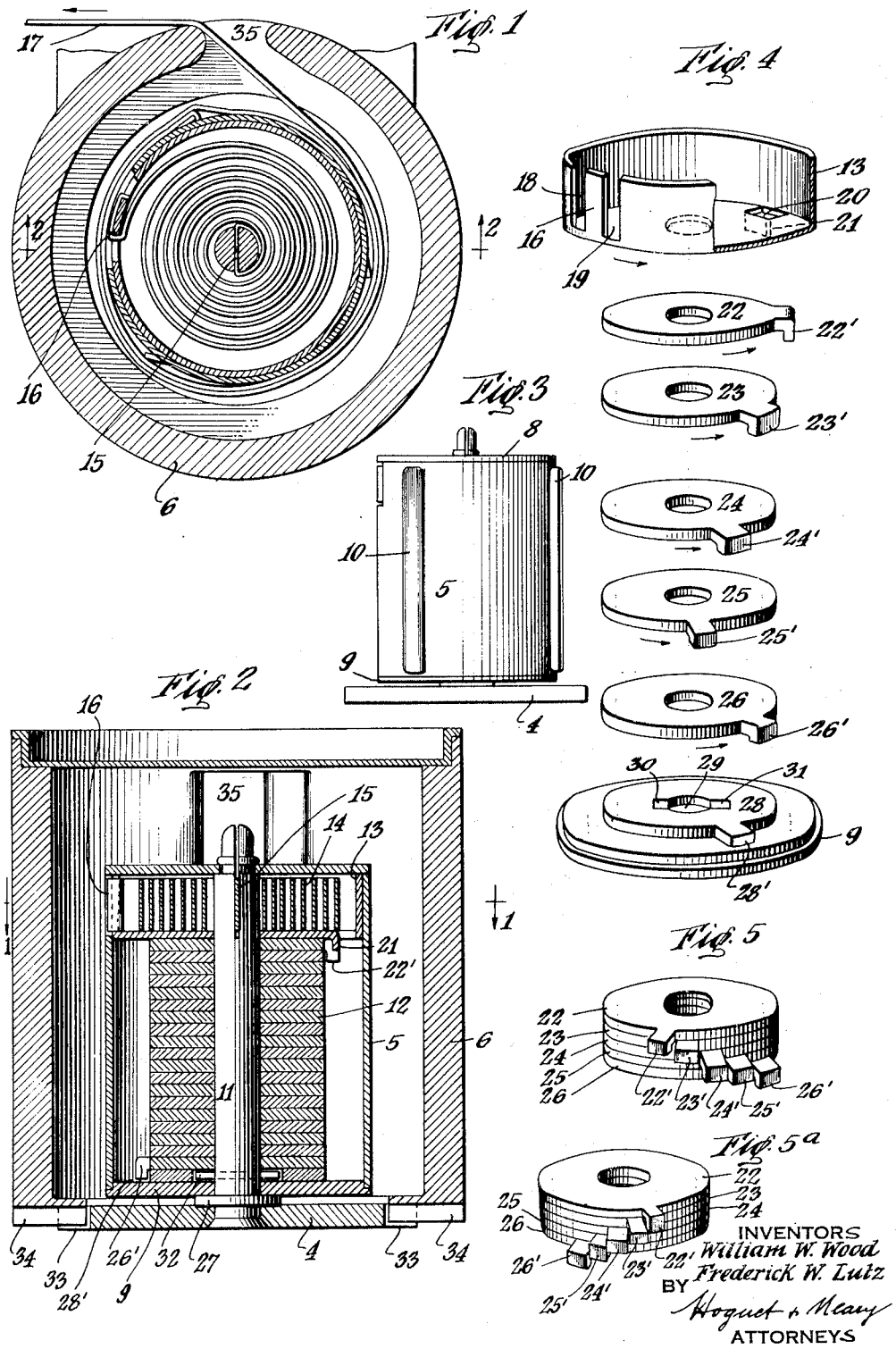

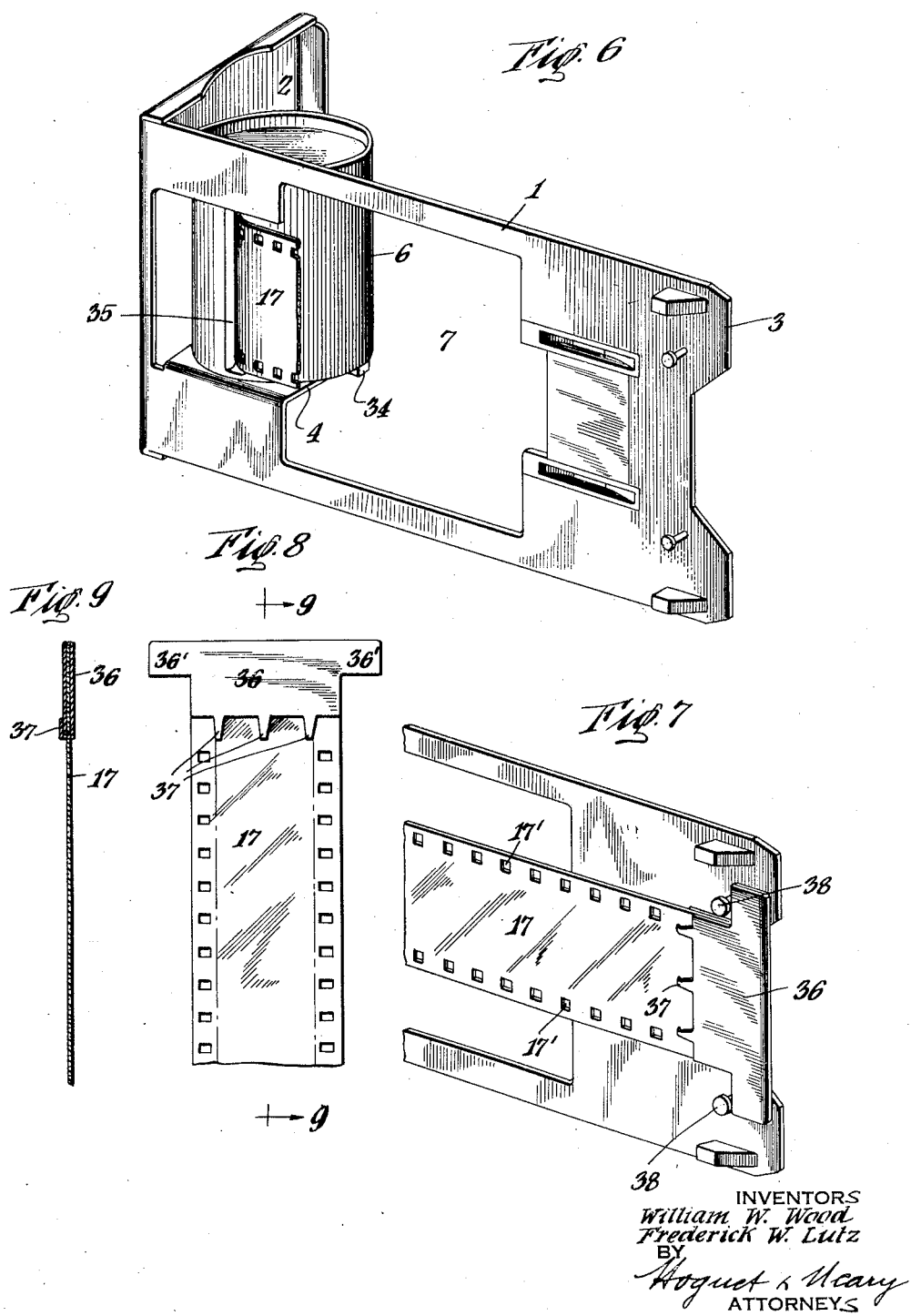

1,956,938

UNITED STATES PATENT OFFICE 1,956,938

FILM TENSIONING AND POSITIONING DEVICE FOR PHOTOGRAPHIC PROJECTORS

William W. Wood and Frederick W. Lutz, New York, N. Y., assignors to Visomatic Systems, Inc., New York, N. Y., a corporation of New York Application June 25, 1932, Serial No. 619,288

22 Claims. (Cl. 88—28)

This invention relates in general to photographic projection devices and more particularly to film tensioning and positioning devices therefor.

An object of the invention is to provide a self contained film carrying unit which will provide for the proper film tensioning and centering, and which unit may be readily releasably installed and interchangeable as a whole so as to minimize the difficulty encountered in the changing of film reels in the conventional projectors.

A further object is to provide such a unit that will include a detachable film reel and film carrying gate which latter will also extend through the projector casing and constitute the means for insuring the proper alignment and positioning of the film with the winding mechanism.

A further object is to provide an improved reel which will provide for a uniform speed of film travel under recoil and which will insure the presence of a recoil force at all times regardless of the extent of film travel or the various adjustments of the film with respect thereto or the winding and carrying devices.

With the foregoing and other objects in view, the invention consists in the combination of parts and in the details of construction hereinafter set forth in the following specification and appended claims, certain embodiments thereof being illustrated in the accompanying drawings, in which:

Figure 1 is a view in cross section of the film tensioning reel and film container.

Figure 2 is a view in section taken along line 2—2 of Figure 1.

Figure 3 is a view in elevation of the tensioning reel.

Figure 4 is a composite view in perspective of the component parts of the tensioning reel.

Figure 5 is a view in perspective of the tensioning reel discs assembled and in the position they assume under added spring tension.

Figure 5a is a similar view showing the discs in normal set position.

Figure 6 is a view in perspective of the film tensioning reel and container and the gate for carrying the same.

Figure 7 is a view in perspective of one end of the gate showing the film clip and film retaining means.

Fgure 8 is a detail view of the film and film clip.

Figure 9 is a view taken along line 9—9 of Figure 8.

Referring more particularly to the drawings, Figure 6 shows the film gate 1, which is provided at one end with a plate 2 which fits flush with the projector casing as the other end 3 of the gate is pushed through suitable apertures in the casing so that the end 3 extends therebeyond. The gate is formed with a ledge 4 for supporting the tensioning reel 5 and the film container 6, and with an opening 7 to allow projection of the film.

The tensioning reel comprises a cylindrical casing with removable end plates 8 and 9 and with film engaging clips 10. The reel is secured to the ledge 4 of the gate by means of a suitable concentrically disposed stationary shaft 11. Around this shaft are loosely fitted a series of discs which will be generally referred to in Figure 2 at 12. Also loosely fitted about this shaft and resting on the top disc and within the casing 5 is a housing 13 for a spiral coil spring 14, which latter has one of its ends connected at 15 to the stationary shaft and its other end to the casing at 16. Thus, referring to Figure 1, the pulling of the film 17, one end of which is retained by the clips 10 in the direction indicated by the arrow, will cause a counterclockwise rotation of the housing and casing which will be resisted by the action of the coil spring.

In Figure 4 there is shown the spring housing which is recessed at 18 and 19 to provide the post 16 around which the outer end of the spring is connected. The bottom wall of the housing is punched out at 20 to form a downturned lug 21. In assembly this housing rests on a disc 22 which is also formed with a downturned lug 22'. The radius of disc 22 is slightly less than the distance between the center of the bottom wall of the housing to the lug 21 so that the disc is free to rotate until lug 21 engages 22'. Discs 23, 24, 25, and 26 are of uniform size and provided with lugs 23', 24', 25' and 26' respectively in such a manner that the adjacent lugs engage each other but clear the main body portion of the adjacent disc.

The shaft 11 being secured in non-rotative relation to the gate ledge 4 is provided with an enlargement 27 to form a bearing for the rotating casing 5. The bottom wall 9 has secured thereto or integral therewith a plate 28 with a peripheral lug 28' formed thereon and the central aperture 29 is extended at 30 and 31 to provide a keyway for the reception of a key member 32 fixed to the shaft 11.

The film container 6 as explained before is fitted loosely over the tensioning reel and the ledge 4 is recessed at 33 to receive a key 34 carried by the container so as to secure the latter against rotation. The inner end of the film is engaged by one of the clips 10 and the film is drawn out through the aperture 35 of the container against the action of the coil spring.

As stated before, any suitable number of such discs may be used. The recoil action of the return spring is in a clockwise direction. Figure 5a shows some of the discs assembled and in the normal relation they assume before the film container is applied, or before any film has been drawn out after the container has been applied. The engagement of the adjacent overlapping lugs of the adjacent discs, the engagement of lug 21 of the spring housing with lug 22' of the disc 22, and the engagement of the lug 26' of the lower disc 26 with the lug 28' of the fixed plate all cooperate to prevent a further clockwise rotation either of the casing or any clockwise relative rotation of any of the parts contained therein. Even while the various lugs are in this position, the spring is under tension in order to insure the return of the film regardless of the amount fed out, which feeding out merely increases an already existing spring tension.

The film after having been placed in the container and the latter placed on the gate ledge, is pulled out sufficiently to grasp the end and affix thereto a metal clip 36 having prongs 37 which are forced through the film and bent back as shown in Figure 9. The metal clip is also formed with extensions 36' extending past the edges of the film and as the film is manually pulled forwardly these extensions of the clip engage pins 38 formed on the gate to prevent return of the film or the film clip past the pins. The projector casing may easily be so arranged that with the gate and film in the position shown in Figure 7, any suitable operating sprocket may be arranged to engage the usual film perforations 17' in order that the film may be wound against the action of the return spring. The gate end 3 may also be so arranged as to be capable of a slight rocking movement so that a manual pressure to one side may disengage the winding sprocket from the film notches. In the event that this is done at any time during or at the completion of the projection of the film the latter will be drawn by the return spring until the clip again engages the pins 38. This position of the film may be such that the first of a series of pictures will be in proper position for projection.

Thus in actual practice the device is particularly adapted to make it possible in a picture projection apparatus to initially set and center the film in a unit comprising interchangeable parts before the unit is inserted in the projection apparatus and moreover, to insure proper feeding and return of the film, the showing of which may be repeated with no adjustments being necessary after its simple release and automatic return to a predetermined position.

It is of importance in such apparatus that the force of the spring tending to return the film shall never be entirely exhausted and also that such force shall be uniformly transmitted to the film so as to cause a uniform and retarded speed of return travel of the film.

Referring to Figures 1 and 5a, as the film is urged forward against the action of the return spring the lug 21 of the film housing engages lug 22' of disc 22 and the housing and disc complete a counterclockwise revolution, at which time lug 23' of disc 23 is engaged by lug 22' and the two discs and the housing rotate in unison in a counterclockwise direction. Thus as the counterclockwise rotation is continued, the lug of each disc upon its initial complete revolution engages the lug of the lower adjacent disc so that a disc is added to the rotation mass at each complete revolution until lug 26' finally engages lug 28', at which time the assembly assumes the relative position, as shown in Figure 5.

Upon a release of the sprocket from the film the spring urges the housing in a reverse and clockwise direction. The speed and extent of this rotation however is maintained uniform and limited by the pallet effect of the discs and their accumulative rotational engagement with each other. This is effected by reason of the fact that the spring housing in clockwise rotation carries the disc 22 away from the latter's position of Figure 5 and an additional disc is picked up on the completion of each clockwise revolution until the assembly assumes the relative position of Figure 5a which has already been described as a locked position against further clockwise rotation but in which position the return force of the return spring is not exhausted.

Having thus described our invention, we claim:

1. In a film projection apparatus, a unit structure comprising a reel including a rotatable body carried by a stationary shaft, a resilient actuating means connecting said body and shaft, means for positively limiting the extent of rotation of said body and for positively effecting tension between said body and said shaft under the action of said resilient means.

2. In a film projection apparatus, a unit structure comprising a reel including a rotatable body carried by a stationary shaft, a resilient actuating means connecting said body and shaft, means for positively effecting an initial tension between said body and said shaft under the action of said resilient means.

3. In a film projection apparatus, a unit structure comprising a reel including a rotatable body carried by a stationary shaft, a resilient actuating means connecting said body and shaft, means for positively effecting a tension between said body and shaft under the action of said resilient means up to the limited extent of travel of said body in that direction, said means including coacting devices for progressively increasing the actual load on said resilient means as said body is rotated against the action thereof.

4. In a film projection apparatus, a unit structure comprising a reel including a rotatable body carried by a stationary shaft, a resilient actuating means connecting said body and shaft, means for positively limiting the extent of rotation of said body and for applying a tension to said body under the action of said resilient means up to the limited extent of travel of said body in that direction, said means comprising coacting devices for progressively increasing the actual load on said resilient means as said body is rotated against the action thereof.

5. In a film projection apparatus, a unit structure comprising a reel including a rotatable body carried by a stationary shaft, a resilient actuating means connecting said body and shaft, means for positively effecting the travel of said body under the action of said resilient means up to the limited extent of travel of said body in that direction, said means comprising a return spring and housing in said body, a plurality of adjacent disks loosely carried by said shaft, coacting lugs on said housing, discs and said shaft for progressively increasing the number of rotating discs upon each revolution of said body and correspondingly increasing the actual load on said spring when said body is manually rotated against said spring.

6. A film reel including a film container and a rotatable film engaging body carried by a stationary shaft and a return spring connected to said body and shaft, means for positively limiting the extent of rotation of said body and for positively effecting the travel of said body under the action of said resilient means up to the limited extent of travel of said body in that direction.

7. A film reel including a film container and a rotatable film engaging body carried by a stationary shaft and a return spring connected to said body and shaft, a reel including a rotatable body carried by a stationary shaft, a resilient actuating means connecting said body and shaft and means for positively effecting the travel of said body under the action of said resilient means up to the limited extent of travel of said body in that direction.

8. A film reel including a film container and a rotatable film engaging body carried by a stationary shaft and a return spring connected to said body and shaft, a reel including a rotatable body carried by a stationary shaft, a resilient actuating means connecting said body and shaft and means for positively effecting the travel of said body under the action of said resilient means up to the limited extent of travel of said body in that direction, said means comprising coacting devices for progressively increasing the actual load on said resilient means as said body is rotated against the action thereof.

9. A film reel including a film container and a rotatable film engaging body carried by a stationary shaft and a return spring connected to said body and shaft, a reel including a rotatable body carried by a stationary shaft, a resilient actuating means connecting said body and shaft and means for positively effecting the travel of said body under the action of said resilient means up to the limited extent of travel of said body in that direction, said means comprising a return spring and housing in said body, a plurality of adjacent discs loosely carried by said shaft, coacting lugs on said housing, discs and said shaft for progressively increasing the number of rotating dics upon each revolution of said body and correspondingly increasing the actual load on said spring when said body is manually rotated against said spring.

10. In combination in a film projection apparatus, a self contained film setting, centering and return unit comprising a gate adapted to extend through said apparatus, coacting devices carried by said film and gate for predetermining the initial and return position of said film, a film reel and an interchangeable film container carried by said gate.

11. In combination in a film projection apparatus, a self contained film setting, centering and return unit comprising a gate adapted to extend through said apparatus, coacting devices carried by said film and gate for predetermining the initial and return position of said film, a film reel and an interchangeable film container carried by said gate, said reel including a rotatable body carried by a stationary shaft, a resilient actuating means connecting said body and shaft, means for positively effecting the travel of said body under the action of said resilient means up to the limited extent of travel of said body in that direction.

12. In combination in a film projection apparatus, a self contained film setting, centering and return unit comprising a gate adapted to extend through said apparatus, coacting devices carried by said film and gate for predetermining the initial and return position of said film, a film reel and an interchangeable film container carried by said gate, said means comprising coacting devices for progressively increasing the actual load on said resilient means as said body is rotated against the action thereof.

13. In combination in a film projection apparatus, a self contained film setting, centering and return unit comprising a gate adapted to extend through said apparatus, coacting devices carried by said film and gate for predetermining the initial and return position of said film, a film reel and an interchangeable film container carried by said gate, said means comprising a return spring and housing in said body, a plurality of adjacent discs loosely carried by said shaft, coacting lugs on said housing, discs and said shaft for progressively increasing the number of rotating discs upon each revolution of said body and correspondingly increasing the actual load on said spring.

14. In combination in a film projection apparatus, a self-contained film carrying unit comprising a gate adapted to extend into said apparatus, a film reel supported on said gate, a film wound on said reel and having an end removably secured to said reel, and means within said reel to place said film under tension as it is unwound therefrom.

15. In combination in a film projection apparatus, a self-contained film carrying unit comprising a gate adapted to extend into said apparatus, a film container mounted on said gate, a film reel within said container supported on said gate, a film wound on said reel and having an end removably secured thereto, and means within said reel to place said film under tension as it is unwound therefrom.

16. The combination as claimed in claim 15, wherein the film reel will automatically rewind the film unwound therefrom upon release of the free end of said film.

17. In combination in a film projecting apparatus, a self-contained film carrying unit comprising a gate having an opening therein to allow projection of the film, an integral ledge extending laterally from said gate, a film container mounted on said ledge, a film reel within said container, a shaft secured to said ledge and adapted to support said reel, a film wound on said reel, and means within said reel to place said film under tension as it is unwound therefrom.

18. In combination in a film projecting apparatus, a self-contained film carrying unit comprising a gate having an opening therein to allow projection of the film, an integral ledge extending laterally from said gate, a film container mounted on said ledge, a film reel within said container, a film wound on said reel and having an end removably secured thereto, said film extending outwardly from said container, and means secured to the outer end of said film adapted to mechanically engage said gate whereby said film may be definitely located under tension in respect to the opening in said gate.

19. In combination in a film projection apparatus, a self-contained film carrying unit comprising a gate adapted to extend into said apparatus, said gate having an opening therein to allow projection of the film, a film reel supported on said gate, a film wound on said reel, means tending to rewind the film as it is unwound from said reel, and means partly on said film and partly on said gate whereby the positioning of said film in respect to the opening in said gate may be mechanically determined.

20. In combination in a film projection apparatus, a self-contained film carrying unit comprising a gate adapted to extend into said apparatus, said gate having an opening therein to allow projection of the film, a cylindrical film container supported on said gate, said container having a slot therein, a film reel supported in said container, a film wound on said reel and projecting from the slot in said container, and means tending at all times to rewind said film on said reel and to withdraw the outwardly projecting end of same into said container upon the release of the free end of the film.

21. In a picture projector, a supporting frame having clip engaging means thereon constituting a film gate, a cylinder on said frame, and a film having its inner end adapted to engage said cylinder and a clip secured to its outer end adapted to engage said clip engaging means to definitely locate said film in respect to said film gate.

22. In a motion picture projector, a frame, a rotatable cylinder having a projection thereon, a film having its inner end adapted to engage said projection and a clip secured to the outer end of said film and adapted to engage said frame whereby said film may be definitely positioned for starting in respect to the optical system of the projector.

WILLIAM W. WOOD.
FREDERICK W. LUTZ.